United States Patent [19]
Di Maggio et al.

[11] 3,800,063
[45] Mar. 26, 1974

[54] ELECTRICAL SERVICE PEDESTAL

[76] Inventors: Vincent H. Di Maggio, 751 Spencer St., Monterey, Calif. 93940; John Wong, 820 Bedford Dr., Salinas, Calif. 93901

[22] Filed: June 28, 1972

[21] Appl. No.: 284,416

[52] U.S. Cl. .................... 174/38, 174/95, 317/120
[51] Int. Cl. .......................... H02g 9/00, H02b 1/08
[58] Field of Search .......... 174/37, 38, 45 R, 48, 49, 174/60, 95, 96, 97, 100, 101; 317/104, 105, 111, 120

[56] References Cited
UNITED STATES PATENTS

| 297,182 | 4/1884 | Shelbourne | 174/45 R |
| 1,481,280 | 1/1924 | Bivens | 174/38 UX |
| 2,096,857 | 10/1937 | Pixley et al. | 317/105 |
| 3,082,290 | 3/1963 | Ohmit | 174/49 |
| 3,373,276 | 3/1968 | Klein | 174/38 X |
| 3,485,932 | 12/1969 | Van Schaack | 174/38 |
| 3,596,141 | 7/1971 | Jones et al. | 174/38 X |
| 3,604,835 | 9/1971 | Hamilton | 174/38 |
| 3,691,288 | 9/1972 | Sturdivan | 174/38 |

FOREIGN PATENTS OR APPLICATIONS

| 1,561,565 | 2/1969 | France | 174/97 |
| 1,194,946 | 6/1965 | Germany | 317/104 |
| 694,397 | 9/1965 | Italy | 174/48 |

*Primary Examiner*—Laramie E. Askin
*Attorney, Agent, or Firm*—Van W. Smart

[57] ABSTRACT

An electrical service pedestal for mounting a meter and circuit breaker panel to serve traffic signal systems, lighting systems, and the like, comprising an elongate rectangular structure formed of generally channel shaped members and having both a fixed top plate and bottom base plate. The structure, which is upright in normal placement, has an interior dividing partition which extends for its full length. The bottom base plate has a plurality of holes for securing said structure to a concrete foundation and an aperture which is generally bisected by the dividing partition at the juncture of the rectangular structure and the base plate. The inside of the structure cooperates with the dividing partition to form two raceways for carrying a plurality of unfused and fused service wires to and from a meter and breaker panel, a device common to the art, that could be mounted on the front of the pedestal.

10 Claims, 7 Drawing Figures

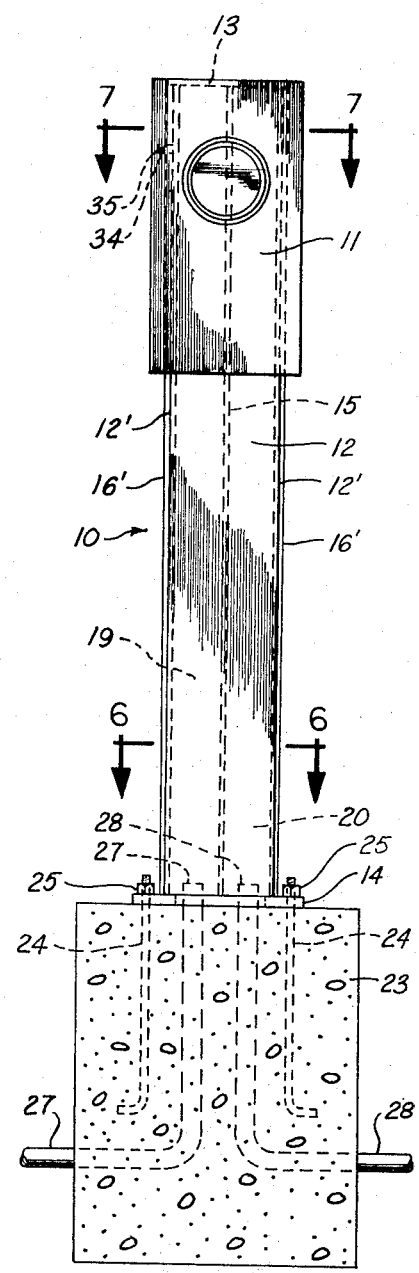
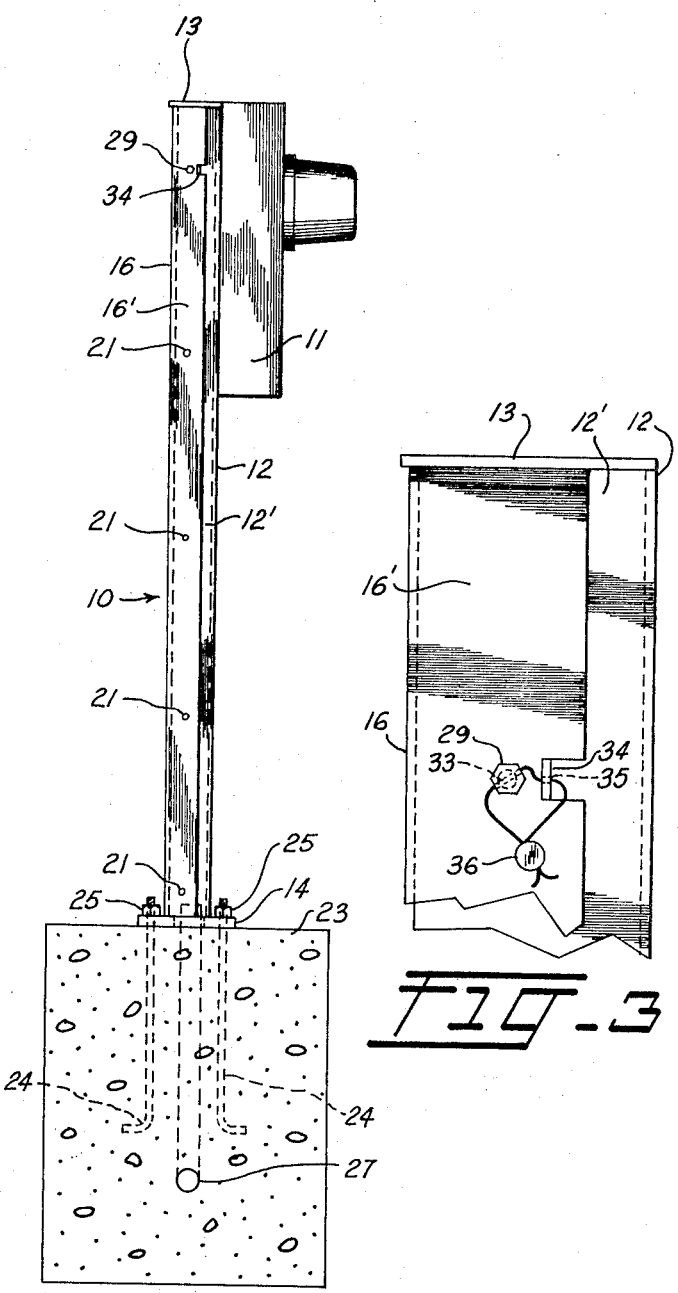
Fig. 1  Fig. 2  Fig. 3

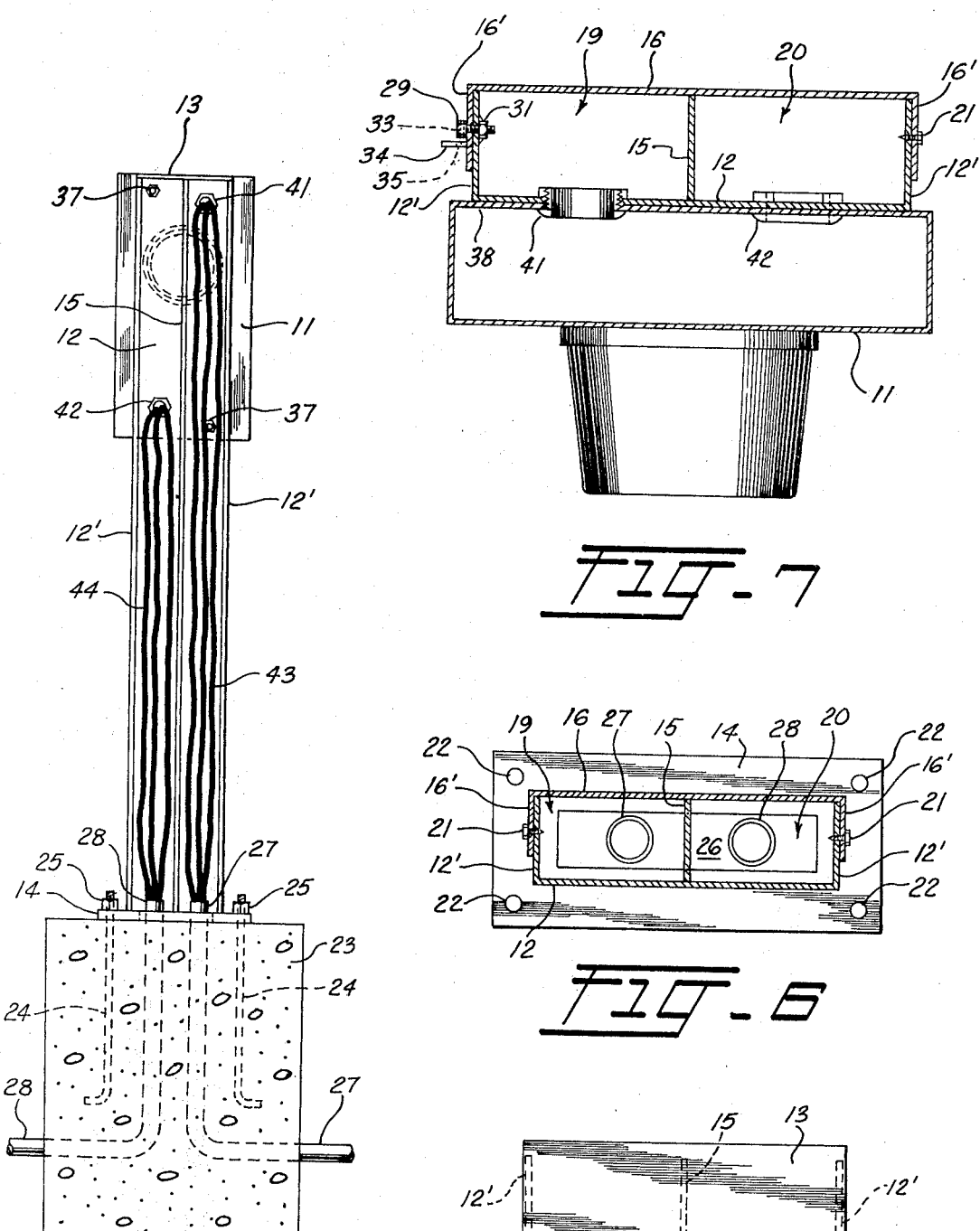

ELECTRICAL SERVICE PEDESTAL

BACKGROUND OF THE INVENTION:

1 Field of the Invention

This invention pertains to an upright installed electrical service pedestal for the mounting of a meter and circuit breaker panel which serves traffic signal systems, lighting systems, and the like in underground electrical distribution areas.

2 Description of the Prior Art:

In the current interest to improve our visual environment much effort is being expended in placing overhead electrical, telephone, and CATV wires and the like in underground installations. Indeed, many municipalities have adopted ordinances which require all new residential, commercial, and industrial subdivisions to be initially constructed with complete underground utility systems and further require that existing overhead utility systems in use be undergrounded on a gradual basis. Specifically, when undergrounding electrical facilities which serve homes or commercial buildings, the property owner usually is required to construct underground conduits from his service panel out to the street line where the utility company's underground pull box and service wires are made available for reconnection. Following conversion to an underground distribution system, the former overhead electrical wires, poles, service drop wires, weatherheads, service poles, and auxiliary facilities are removed, but the property owner's service panel which generally is mounted on an outside or inside building wall, remains intact. Where an overhead distribution system serves a traffic signal or lighting system within the public right of way, the current practise is to mount the meter and breaker panel assembly on a service pole. The overhead service wires contact the service pole at a weatherhead and are extended down to the meter and breaker panel assembly inside a conduit. These wires are thence carried to the traffic signal equipment or lighting system by an underground conduit. The conversion to an underground system at such a location usually requires removal of the service pole. As a substitute for the service pole, one method employed by the art involves mounting the meter and breaker panel assembly on a 3–4 inch diameter pipe pedestal; but since the National Electric Code and many state and local codes require that separate conduits or raceways be provided for unfused and fused wires, one or more conduits are required to carry these wires to and from the meter and breaker panel assembly. In some installations, this is accomplished by placing the conduit carrying the unfused wires inside the larger diameter pipe pedestal, while the fused wires, having gone through the meter and breaker panel assembly, are placed coaxially inside the pedestal to the load. In other installations, the conduit carrying unfused wires is placed generally along side the pipe pedestal, thus giving the appearance that the meter and breaker panel assembly is supported by a pedestal and a conduit. These methods used in furnishing electric service are unsatisfactory because they do not easily meet code requirements nor do they allow easy access to circuit wires by authorized persons. Additionally, the plurality of conduits used in some installations makes relocation difficult, does not allow adequate foundation anchorage, and is difficult to modify in the event of circuit changes or repairs.

The channel shaped, stake type pedestal ordinarily employed in mobile home installations was found unsuited for use in traffic signal and lighting systems because these pedestals generally utilize a meter and breaker panel on which a plurality of outlet sockets are provided for the user. The service wires in such installations once having traversed the meter and breaker devices, are not extended back down the tubular pedestal to the load. Additionally, the stake type pedestal lacks rigidity and robustness which are of paramount importance where such pedestals are installed in the public right of way to serve traffic signal and lighting installations.

SUMMARY OF THE INVENTION

The electrical service pedestal as disclosed herein will provide a means for the supporting of meter and breaker panel assemblies which serve traffic signal systems, lighting systems, and the like in underground electrical distribution areas. The pedestal will meet code requirements for physical separation of fused and unfused service wires by providing isolated raceways inside a rigid, self supporting structure that is firmly anchored to a suitable foundation.

The design of the pedestal permits for its easy relocation and allows improved and unobstructed access to service wires during installation and in the event of circuit enlargements, changes, or repairs.

In a housing which eliminates use of visible conduits, the electrical service pedestal presents a more pleasing appearance. It may be used to support enclosures for other applications such as fire alarm and police call boxes and other electrical devices intended for installation in the public right of way. The electrical service pedestal is relatively simple for those skilled in the art to fabricate at a reasonable cost.

BRIEF DESCRIPTION OF THE DRAWINGS

FIG. 1 is a front elevational view of the electric service pedestal as the pedestal is used with a meter and breaker panel assembly, and as mounted on a concrete foundation.

FIG. 2 is a left side elevational view of the pedestal.

FIG. 3 is a fragmentary side view on a larger scale showing a sealable bolt for attaching thereon a mechanical seal.

FIG. 4 is a top detail view of the top plate.

FIG. 5 is a rear elevational view of the pedestal with its back cover removed to show a dividing partition, the service wires, and bushed apertures between the pedestal and meter and breaker panel assembly.

FIG. 6 is a sectional view taken along lines 6—6 of FIG. 1 showing the base plate details and juncture of the elongated structure and base plate.

FIg. 7 is a sectional view taken along line 7—7 of FIG. 1 showing the bushed apertures between the pedestal and breaker panel assembly and the sealable bolt for attaching thereon a mechanical seal.

DESCRIPTION OF THE PREFERRED EMBODIMENTS

Referring to the drawings, the numeral 10 generally designates a service pedestal with a combination meter and breaker panel assembly 11 mounted thereon. The pedestal consists of an elongate structure formed by a front channel member 12 and a removable back cover 16, both of which are generally U-shaped in cross section and formed from a material such as sheet metal stampings. The top plate 13 and base plate 14, made from a material such as sheet metal, are generally rectangularly shaped and are secured to the front channel member 12, as shown, by a suitable method as by welding. The dividing partition 15 is an elongate rectangular plate made from a material such as sheet metal. When placed in the preferred position inside the service pedestal 10, the dividing partition 15 makes generally perpendicular contact with the top plate 13, the front channel member 12, base plate 14, and back cover 16, thus forming two isolated spaces or raceways 19, 20, which are approximately equal in size. The contacting surfaces between the dividing partition 15 and the top plate 13, the front channel member 12, and base plate 14 are secured by a suitable method such as by welding.

When the back cover 16 is placed in its preferred position as shown, the side walls 12' of the front channel member 12 are snugly psitioned between the side walls 16' of the back cover 16. The bottom edge of the back cover 16 rests on the base plate 14 and the top edge of the back cover 16 is coincident with the top edge of the front channel member 12. Both the back cover 16 and the front channel member 12 have a plurality of corresponding apertures bored in their overlaying side walls 16' and 12' respectively, through which suitable fasteners such as self tapping screws 21 are inserted to permit the releaseable securement of the back cover 16.

When secured to the service pedestal 10, the top plate 13, has one edge flush with the front exterior surface of the front channel member 12, two edges flush with the exterior surfaces of side walls 16' and one edge that overhangs the exterior surface of the back cover 16.

The base plate 14 is generally rectangularly shaped and made from a material such as sheet metal. A plurality of apertures 22 are bored through the base plate 14 to allow its releaseable securement to a suitable foundation 23 with a plurality of anchor bolts 24 and anchor bolt nuts 25. The base plate 14 has an opening 26 which has smaller dimensions than the interior cross sectional dimensions of the elongate structure formed by channel member 12 and back cover 16. In fabricating the pedestal 10, the preferred placement of the base plate 14 with respect to the elongate structure is such that the opening 26 is generally centered inside the structure with the dividing partition 15 bisecting the width of the opening 26. An alternate method for securing the pedestal to the foundation is to fabricate the lower end of the front channel member 12 and side walls 12' such that their edges are bent either inward or outward to provide a projecting ledge through which apertures are bored to allow releaseable securement of the pedestal.

In construction of the pedestal foundation 23 the entry service conduit 27, exist service conduit 28, and anchor bolts 24 are cast in the foundation. The service conduits 27, 28 should preferably protrude slightly above the top of the foundation 23 such that when the pedestal 10 is placed in position the conduits 27, 28, protrude through the opening 26 and extend into the raceways 19 and 20, as shown.

A conventional sealable bolt 29 is provided on the service pedestal 10 to permit the attachment of a utility company mechanical seal 36. The sealable bolt 29, is passed through an aperture bored through the side walls 12' and 16' and into the sealable bolt nut 31, which is secured on the inside of the side wall 12' of the front channel member 12 as by welding. The head of the sealable bolt 29, is provided with an aperture 33. Adjacent to the sealable bolt 29, a conventional ear 34 is provided with an aperture 35. One method of providing such an ear is by making two horizontal cuts in the marginal edge of side wall 16' and bending the metal to a position perpendicular to the side wall 16' and in juxtaposition with the sealable bolt 29, as shown. Once the sealable bolt 29 is tightened, a suitable tamper-indicating mechanical seal 36 is looped through apertures 33 and 35.

As shown, the combination meter and breaker panel assembly 11 is affixed to the service pedestal 10 at the upper most end of the pedestal, but the placement may be varied to suit the requirements of the electric utility company. The meter and breaker panel assembly 11 is attached to the front channel member 12 by use of a plurality of machine bolts 37, which extend through the rear wall 38 of the member and breaker panel assembly 11 and into the raceways 19 and 20 thus securing the units in a back to front relation. A plurality of registered openings or holes are provided through the rear wall 38 and front channel member 12 for placement of suitable insulated bushings 41, 42, which are devices common to the art. The bushings 41, 42, are placed in suitable positions for access openings between the raceways 19, 20 and the metering section and circuit breaker section of the meter and breaker panel assembly 11.

When placing the pedestal in service, the plurality of unfused wires 43 from the underground electric service mains would be carried into raceway 19, of the service pedestal 10 by the entry service conduit 27. These wires 43, would then be routed through insulated bushing 41 and thence into the metering section and breaker devices of the meter and breaker panel assembly 11. A plurality of fused wires 44, emanating from the breaker devices would then be routed through the insulated bushing 42 to the adjacent raceway 20 and into the exist service conduit 28 to the traffic signal or lighting equipment load. It should be noted that additional enclosures could be secured to the service pedestal 10 below the mounting position of the meter and breaker panel assembly 11. The additional enclosures may be used to house lighting circuit relays and the like. In such installations additional insulated bushings similar to 41 and 42 would be required between the additional enclosures and raceway 20, which serves the plurality of fused wires 44. It should also be noted that although the illustrated pedestal 10 has one interior dividing partition 15 and provides for mounting one meter and breaker panel assembly 11, the pedestal can easily be fabricated with a plurality of interior dividing partitions to accommodate a plurality of meter and breaker panel assemblies and the like.

From the foregoing description taken together with the accompanying drawings, it will be readily apparent that this invention provides an improved electrical service pedestal to mount thereon a meter and breaker panel assembly and other electrical enclosures in a manner that affords ease in installation, maintenance, or relocation. This easily fabricated pedestal provides, within the structure, the separate and distinct raceways required by codes for fused and unfused wires thereby eliminating numerous unsightly exterior conduits.

We claim:

1. An improved service pedestal for an underground electric distribution system of the type having
   A. an elongate structure formed of a front channel shaped member, a generally U-shaped back cover and means for the releaseable securing of said back cover to the front channel shaped member,
   B. a top plate secured to the elongate structure,
   C. attachment means for the placement of a mechanical seal, said means comprising a sealable bolt that is passed through an aperture bored through the overlaying sidewalls of the front channel member and back cover, the head of said sealable bolt having an aperture bored transversely therein, the nut of the bolt being secured to the inside wall of said front channel member; the aperture of said sealable bolt cooperating with and in juxtaposition to a second aperture that is bored through an ear which is affixed to the exterior sidewall surface of the back cover, wherein the improvement comprises;
   D. one or more full length dividing partition positioned vertically inside the elongate structure, said partitions cooperating with the interior surfaces of the structure to provide full length, isolated wiring raceways.

2. The pedestal of claim 1 above, wherein the elongate structure is provided with a base plate means for releasable anchorage to a suitable foundation and for extension of service conduits into the isolated wiring raceways of said structure, said base plate means having a plurality of apertures for receiving foundation bolts and one or more raceway entrance apertures.

3. The pedestal of claim 1 above, wherein the elongate structure is provided with a projecting ledge means for anchorage to a suitable foundation, said projecting ledge means comprising a plurality of apertures bored on a horizontally projecting ledge extending from the lower end of the front channel member.

4. An improved service pedestal for underground electrical distribution systems of the type having:
   A. an elongate structure formed of a front channel shaped member and a generally U-shaped back cover; and
   B. means for the releaseable securing of said back cover to the front channel member; and
   C. a top plate secured to the elongate structure; and
   D. attachment means for the placement of a mechanical seal, said means comprising a sealable bolt that is passed through an aperture bored through the overlaying sidewalls of the front channel member and back cover, the head of said sealable bolt having an aperture bored transversely therein, the nut of the bolt being secured to the inside wall of the front channel member; the aperture of said sealable bolt cooperating with and in juxtaposition to a second aperture that is bored through an ear which is affixed to the exterior sidewall surface of the back cover, wherein the improvement comprises;
   E. attachment means integral with and located at the base of the front channel shaped member for the purpose of demountable anchorage of the pedestal to a concrete foundation by bolts, said attachment means having (1) a horizontal position generally perpendicular to the vertical axis of the elongate structure, (2) a plurality of bored apertures along its peripheral edges, and (3) an open area at the base which has dimensions that are equal to or less than the plan dimensions of the elongate structure; and
   F. one or more internal dividing partitions which extend the full vertical height of the pedestal, which partitions are secured to the interior surfaces of the pedestal at the top plate and the front channel member so that when the back cover is secured, the said dividing partitions cooperate with the interior surfaces of the pedestal to form, two or more, isolated, full length, wiring raceways through which underground service conduits may enter and leave by way of the open area at the foot of the pedestal; and
   G. a plurality of insulated wiring bushings attached to the front channel shaped member of the pedestal for passage of unfused electrical conductors from one or more isolated wiring raceways within the pedestal into meters, circuit breaker panels, police call boxes, or fire alarms mounted on said front channel shaped member and for return of the fused electrical conductors to one or more additional isolated wiring raceways.

5. An improved service pedestal for underground electrical distribution systems of the type having:
   A. an elongate structure formed of a front channel shaped member and a generally U-shaped back cover; and
   B. means for the releaseable securing of said back cover to the front channel shaped member; and
   C. a top plate secured to the elongate structure; and
   D. attachment means for the placement of a mechanical seal, said means comprising a sealable bolt that is passed through an aperture bored through the overlaying side walls of the front channel member and back cover, the head of said sealable bolt having an aperture bored transversely therein, the nut of the bolt being secured to the inside wall of the front channel member; the aperture of said sealable bolt cooperating with and in juxtaposition with a second aperture that is bored through an ear which is affixed to the exterior sidewall surface of the hack cover, wherein the improvement comprises;
   E. a base plate secured to the base of the front channel member, said base plate lying in a plane which is generally perpendicular to the vertical axis of the said front channel member and having (1) a number of bored apertures along its peripheral edges for demountable anchorage to a concrete foundation with bolts embedded in said concrete foundation and also having (2) in opening with dimensions which are less than or equal to the internal plan dimensions of the pedestal; and
   F. an internal dividing partition which extends the full vertical height of the pedestal, which partition is (1) secured to the interior surfaces of the pedestal at the top plate, the front channel shaped member, and the base plate and (2) intersects and divides the opening of the base plate so that when the back cover is secured, the said dividing partition cooperates with the interior surfaces of the pedestal to form isolated, full length, wiring raceways through which underground service conduits enter by way of the divided opening in the base plate; and G. a plurality of insulated wiring bushings attached to the front channel shaped member of the pedestal for passage of unfused electrical conductors from an isolated wiring raceway within the pedestal into meters, circuit breaker panels, police call boxes, or fire alarms, mounted on said front channel shaped member and for return of the fused electrical conductors into the other isolated wiring raceway.

6. The pedestal of claim 5 above, wherein the generally rectangular structure is provided with a plurality of internal dividing partitions to form a plurality of isolated, full length, wiring raceways.

7. An improved service pedestal for underground electrical distribution systems of the type having:
A. an elongate structure formed of a front channel shaped member and a generally U-shaped back cover; and
B. means for the releaseable securing of the said back cover to the front channel shaped member; and
C. a top plate secured to the elongate structure; and D. attachment means for the placement of a mechanical seal, said means comprising a sealable bolt that is passed through an aperture bored through the overlaying sidewalls of the front channel shaped member and the back cover, the head of said sealable bolt having an aperture bored transversely therein, the nut of the bolt being secured to the inside wall of the front channel shaped member; the aperture of said sealable bolt cooperating with and in juxtaposition with a second aperture that is bored through an ear which is affixed to the exterior sidewall surface of the back cover, wherein the improvement comprises;
E. an internal horizontally projecting ledge formed at the bottom of the front channel shaped member by bending inwardly at the bottom front and bottom side edges of said front channel shaped member, the dimensions of said horizontally projecting ledge being such that the total width of the horizontally projecting ledge formed by the inward bending of the sides of the said front channel shaped member is less than the internal width of said front channel shaped member and the width of the horizontally projecting ledge formed by the inward bending of the front edge of said front channel shaped member is less than the internal depth of the said front channel shaped member, said horizontally projecting ledge having a plurality of bored apertures along its peripheral edges for demountable anchorage to a concrete foundation; and
F. an internal dividing partition which extends the full vertical height of the pedestal, which partition is (1) secured to and in contact with the interior surfaces of the top plate, the front channel shaped member, and the internal horizontally projecting ledge and (2) bisects the opening formed by said horizontally projecting ledge in cooperation with the U-shaped back cover when said cover is secured in place and (3) is in contact with the interior surface of said back cover when said back cover is secured in place to form isolated, full length, wiring raceways through which underground service conduits enter by way of said bisected opening; and G. a plurality of insulated wiring bushings attached to the front channel shaped member of the pedestal for passage of unfused electrical conductors from an isolated wiring raceway within the pedestal into meters, circuit breaker panels, police call boxes, or fire alarms mounted on said front channel shaped member and for return of the fused electrical conductors into the other isolated wiring raceway.

8. The pedestal of claim 7 above, wherein the generally rectangular structure is provided with a plurality of internal dividing partitions which cooperate to form a plurality of isolated, full length, wiring raceways.

9. An improved service pedestal for underground electrical distribution systems of the type having:
A. an elongate structure formed of a front channel shaped member and a generally U-shaped back cover; and
B. means for the releaseable securing of the said back cover to the front channel shaped member; and
C. a top plate secured to the elongate structure; and D. attachment means for the placement of a mechanical seal, said means comprising a sealable bolt that is passed through an aperture bored through the overlaying sidewalls of the front channel member and back cover, the head of said sealable bolt having an aperture bored transversely therein, the nut of the bolt being secured to the inside wall of the front channel member; the aperture of said sealable bolt cooperating with and in juxtaposition with a second aperture that is bored through an ear which is affixed to the exterior sidewall surface of the back cover, wherein the improvement comprises;
E. an external horizontally projecting ledge formed at the bottom of the front channel shaped member by bending outwardly the bottom front and bottom side edges of said front channel shaped member, said horizontally projecting ledge having a plurality of bored apertures along its peripheral edges for demountable anchorage to a concrete foundation; and
F. an internal dividing partition which extends the full vertical height of said pedestal, which partition is (1) secured to and in contact with the interior surfaces of the top plate and the front channel shaped member and (2) bisects the opening formed by the cross-sectional shape of the front channel shaped member in cooperation with the cross-sectional shape of the U-shaped back cover at the base of the pedestal and (3) is in contact with the internal surface of said back cover when said back cover is secured in place to form isolated, full length, wiring raceways through which underground service conduits enter by way of said bisected opening; and
G. a plurality of insulated wiring bushings attached to the front channel shaped member of the pedestal for passage of unfused electrical conductors from an isolated wiring raceway within the pedestal into meters, circuit breaker panels, police call boxes, or fire alarms mounted on said front channel shaped member and for return of the fused electrical conductors into the other isolated raceway.

10. The pedestal of claim 9 above, wherein the generally rectangular structure is provided with a plurality of of internal dividing partitions which cooperate to form a plurality of isolated, full length, wiring raceways.

* * * * *

UNITED STATES PATENT OFFICE
CERTIFICATE OF CORRECTION

Patent No. 3,800,063          Dated March 26, 1974

Inventor(s) VINCENT H. DI MAGGIO, ET AL

It is certified that error appears in the above-identified patent and that said Letters Patent are hereby corrected as shown below:

Column 3, line 59, "exist" should read -- exit --

Column 4, line 22, "member" should read -- meter --

Column 4, line 44, "exist" should read -- exit --

Column 5, line 24, "partition" should read -- partitions --

Column 6, line 48, "hack" should read -- back --

Column 6, line 58, "in" should read -- an --.

Signed and sealed this 13th day of August 1974.

(SEAL)
Attest:

McCOY M. GIBSON, JR.              C. MARSHALL DANN
Attesting Officer                 Commissioner of Patents